United States Patent
Lee

(10) Patent No.: US 9,344,541 B2
(45) Date of Patent: May 17, 2016

(54) CALL CONNECTION METHOD AND APPARATUS IN MOBILE TERMINAL

(75) Inventor: Je Min Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 12/927,478

(22) Filed: Nov. 16, 2010

(65) Prior Publication Data
US 2011/0119641 A1 May 19, 2011

(30) Foreign Application Priority Data
Nov. 16, 2009 (KR) .................. 10-2009-0110412

(51) Int. Cl.
*G06F 3/033* (2013.01)
*H04M 1/2745* (2006.01)
*H04M 1/725* (2006.01)

(52) U.S. Cl.
CPC .... *H04M 1/274525* (2013.01); *H04M 1/72519* (2013.01); *H04M 2250/12* (2013.01); *H04M 2250/22* (2013.01)

(58) Field of Classification Search
CPC ... G06F 3/04883; G06F 3/017; G06F 3/0481; G06F 3/0488; G06F 2203/04807
USPC ......................................... 715/863; 455/566
See application file for complete search history.

(56) References Cited

U.S. PATENT DOCUMENTS

| | | | | |
|---|---|---|---|---|
| 5,592,546 A * | 1/1997 | Takahashi | .................. | 379/355.05 |
| 5,598,456 A * | 1/1997 | Feinberg | .................. | 379/42 |
| 5,712,911 A * | 1/1998 | Her | .................. | 379/388.01 |
| 5,787,187 A * | 7/1998 | Bouchard et al. | .................. | 382/115 |
| 6,404,761 B1 * | 6/2002 | Snelling et al. | .................. | 370/352 |
| 6,505,040 B1 * | 1/2003 | Kim | .................. | 455/416 |
| 6,690,954 B2 * | 2/2004 | Ushida | .................. | 455/563 |
| 6,837,857 B2 * | 1/2005 | Stirnemann | .................. | 600/559 |
| 7,212,626 B1 * | 5/2007 | Kobayashi | .................. | 379/354 |
| 7,606,598 B2 * | 10/2009 | Kuhl et al. | .................. | 455/564 |
| 7,636,608 B2 * | 12/2009 | Funk et al. | .................. | 700/108 |
| 7,684,552 B2 * | 3/2010 | Pomerantz et al. | .................. | 379/201.02 |
| 7,746,990 B1 * | 6/2010 | Fabbrizio et al. | .................. | 379/114.13 |
| 7,890,089 B1 * | 2/2011 | Fujisaki | .................. | 455/414.2 |
| 8,077,839 B2 * | 12/2011 | Yasko | .................. | 379/88.16 |
| 8,082,523 B2 * | 12/2011 | Forstall et al. | .................. | 715/863 |
| 8,195,220 B2 * | 6/2012 | Kim et al. | .................. | 455/550.1 |
| 8,229,145 B2 * | 7/2012 | Coughlan et al. | .................. | 381/314 |
| 8,275,412 B2 * | 9/2012 | Alameh et al. | .................. | 455/556.1 |

(Continued)

FOREIGN PATENT DOCUMENTS

JP  2003-259011 A  9/2003

OTHER PUBLICATIONS

Notification of Preliminary Rejection dated Aug. 12, 2015 in connection with Korean Patent Application No. 10-2009-0110412; 10 pages.

*Primary Examiner* — Jung-Mu Chuang

(57) ABSTRACT

A call connection method and apparatus of a portable terminal capable of reducing errors due to automatic call connection using a user gesture and recognition of the user gesture are provided. The call connection method of a portable terminal includes providing a list according to a user request, sequentially sensing a first event and a second event according to a user gesture performed after a specific object in the list is selected, and performing automatic call connection based on the specific object when the first event and the second event are sensed.

15 Claims, 5 Drawing Sheets

(56) References Cited

U.S. PATENT DOCUMENTS

| | | | | |
|---|---|---|---|---|
| 8,304,733 B2 * | 11/2012 | Alameh et al. | | 250/349 |
| 8,320,889 B2 * | 11/2012 | Lee | | 455/414.1 |
| 8,331,899 B2 * | 12/2012 | Broms | | 455/404.1 |
| 8,381,135 B2 * | 2/2013 | Hotelling et al. | | 715/863 |
| 8,395,590 B2 * | 3/2013 | Fisher et al. | | 345/173 |
| 8,532,285 B2 * | 9/2013 | Coughlan et al. | | 379/433.02 |
| 9,225,819 B2 * | 12/2015 | Case | | H04M 1/72552 |
| 2001/0005687 A1 * | 6/2001 | Ushida | | H04M 1/271 455/575.1 |
| 2002/0149705 A1 * | 10/2002 | Allen et al. | | 348/734 |
| 2004/0176702 A1 * | 9/2004 | Stirnemann | | 600/559 |
| 2004/0235520 A1 * | 11/2004 | Cadiz et al. | | 455/557 |
| 2005/0035955 A1 * | 2/2005 | Carter et al. | | 345/175 |
| 2005/0097189 A1 * | 5/2005 | Kashi | | 709/217 |
| 2005/0208925 A1 * | 9/2005 | Panasik et al. | | 455/404.1 |
| 2005/0227680 A1 * | 10/2005 | Snowden | | 455/416 |
| 2006/0052109 A1 * | 3/2006 | Ashman et al. | | 455/440 |
| 2006/0093161 A1 * | 5/2006 | Falcon | | 381/104 |
| 2006/0128442 A1 * | 6/2006 | Cho | | 455/569.1 |
| 2006/0161870 A1 * | 7/2006 | Hotelling et al. | | 715/863 |
| 2006/0279896 A1 * | 12/2006 | Bruwer | | 361/179 |
| 2007/0075965 A1 * | 4/2007 | Huppi et al. | | 345/156 |
| 2007/0127702 A1 * | 6/2007 | Shaffer et al. | | 379/355.04 |
| 2007/0165806 A1 * | 7/2007 | Bocking et al. | | 379/142.01 |
| 2007/0176898 A1 * | 8/2007 | Suh | | 345/158 |
| 2007/0190986 A1 * | 8/2007 | Lee | | 455/414.1 |
| 2007/0238487 A1 * | 10/2007 | Kuhl et al. | | 455/566 |
| 2007/0263603 A1 * | 11/2007 | Schmitt | | 370/356 |
| 2008/0014989 A1 * | 1/2008 | Sandegard et al. | | 455/557 |
| 2008/0049921 A1 * | 2/2008 | Davis | | H04M 3/56 379/202.01 |
| 2008/0055263 A1 * | 3/2008 | Lemay | | H04M 1/72522 345/173 |
| 2008/0055269 A1 * | 3/2008 | Lemay | | G06F 3/0482 345/173 |
| 2008/0107051 A1 * | 5/2008 | Chen | | H04W 48/18 370/310 |
| 2008/0140868 A1 * | 6/2008 | Kalayjian et al. | | 710/8 |
| 2008/0165160 A1 * | 7/2008 | Kocienda | | G06F 3/04883 345/175 |
| 2008/0168379 A1 * | 7/2008 | Forstall et al. | | 715/778 |
| 2008/0226041 A1 * | 9/2008 | Ramamoorthy et al. | | 379/88.01 |
| 2009/0007017 A1 * | 1/2009 | Anzures et al. | | 715/835 |
| 2009/0060170 A1 * | 3/2009 | Coughlan | | H04M 1/605 379/433.02 |
| 2009/0131114 A1 * | 5/2009 | Mukai et al. | | 455/564 |
| 2009/0197615 A1 * | 8/2009 | Kim | | H04M 1/605 455/456.1 |
| 2009/0264113 A1 * | 10/2009 | Jheng | | 455/416 |
| 2009/0303204 A1 * | 12/2009 | Nasiri et al. | | 345/184 |
| 2010/0093405 A1 * | 4/2010 | Ewell, Jr. | | H04M 1/66 455/566 |
| 2010/0149127 A1 * | 6/2010 | Fisher et al. | | 345/174 |
| 2010/0167783 A1 * | 7/2010 | Alameh | | H04M 1/0202 455/556.1 |
| 2010/0197351 A1 * | 8/2010 | Ewell, Jr. | | H04M 1/66 455/565 |
| 2010/0294938 A1 * | 11/2010 | Alameh et al. | | 250/342 |
| 2011/0199470 A1 * | 8/2011 | Moller | | G06F 1/1686 348/61 |
| 2013/0310110 A1 * | 11/2013 | Forutanpour et al. | | 455/556.1 |
| 2015/0373174 A1 * | 12/2015 | Lee | | H04M 1/271 455/563 |

\* cited by examiner

CALL CONNECTION METHOD AND APPARATUS IN MOBILE TERMINAL

CROSS-REFERENCE TO RELATED APPLICATION(S) AND CLAIM OF PRIORITY

The present application is related to and claims the benefit of priority under 35 U.S.C. §119(a) to a Korean patent application filed in the Korean Intellectual Property Office on Nov. 16, 2009, and assigned Serial No. 10-2009-0110412, the entire disclosure of which is hereby incorporated by reference.

TECHNICAL FIELD OF THE INVENTION

The present invention relates to a portable terminal supporting a mobile communication service and, more particularly, to a call connection method performing a user operation for a call connection rapidly and easily in a portable terminal, and an apparatus thereof.

BACKGROUND OF THE INVENTION

In recent years, with the rapid development of electronic technology, functions in a portable terminal have been extended. A recently opened portable terminal provides a video phone call function, a web surfing function accessing wireless Internet, a play function of multi-media data, and a camera function photographing subjects by a digital camera mounted therein as well as a voice call function. Further, a recent portable terminal tends to open a combination of the voice call function, the video phone call function, the wireless Internet function, a media data play function, and a digital camera function.

In particular, the portable terminal may perform voice communication with another portable terminal user using the voice call function. In a typical portable terminal, when a sender inputs a telephone number of a receiver or selects a specific item from a specific list and then inputs a call button requesting command, namely, transmission of a call connection, the sender transmits a signal for the call connection to a partner portable terminal corresponding to the telephone number. Accordingly, the portable terminal achieves the call connection according to a response signal from the partner portable terminal.

As illustrated previously, a general portable terminal user directly inputs a desired telephone number or searches and selects a desired item for a call connection from a list in which a call log is recorded, a phone book list, or a message list, and performs a call button input operation requesting signal transmission to the input telephone number or the selected telephone number.

However, such a call connection operation is inconvenient in that a user should input or select a telephone number, and always input a call button. In particular, due to miniaturization of the portable terminal, the size of a call button becomes smaller. This may increase the inconvenience of having to input the call button. More particularly, in a case of a full touch screen type portable terminal having a limited key input characteristic, there is a convenience to a user of having to exactly input a small call button for call connection. Moreover, in a case of a call button, a button can be mistakenly entered regardless of a user's intention. In this case, there is a problem that a signal transmitting operation is performed for a call connection regardless of a user's intention.

SUMMARY OF THE INVENTION

To address the above-discussed deficiencies of the prior art, it is a primary object to provide a call connection method of a portable terminal that may automatically perform a call connection according to a user gesture in the portable terminal, and an apparatus thereof.

The present invention further provides a call connection method of a portable terminal that may automatically perform a call connection according to a user gesture achieved after selection of a specific object from a list of the portable terminal, and an apparatus thereof.

The present invention further provides a call connection method of a portable terminal that may automatically perform a call connection by only a gesture in which a user touches the portable terminal to an ear upon attempting a call connection through a specific list, and an apparatus thereof.

The present invention further provides a call connection method of a portable terminal that may improve accuracy of user gesture sensing and automatic call connection functions when an automatic call connect function is performed according to a user gesture, and an apparatus thereof.

In accordance with an aspect of the present invention, a call connection method of a portable terminal, includes: providing a list according to a user request; sequentially sensing a first event and a second event according to a user gesture achieved after a specific object in the list is selected; and performing an automatic call connection based on the specific object when the first event and the second event are sensed.

In accordance with another aspect of the present invention, a portable terminal includes: a display unit configured to display a screen of a list corresponding to a user request, the list comprising at least one object, and detect a user selection of the at least one object from the list; a storage unit configured to store a list composed of the at least one object with a telephone number and a reference value corresponding to an automatic call connection function; a sensing unit configured to sense a first event and a second event according to a user gesture corresponding to the automatic call connection function; and a controller configured to process a call connection to a telephone number of a selected object corresponding to the first event and the second event sensed by the sensing unit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the follow

DETAILED DESCRIPTION OF THE INVENTION

Figure 1:
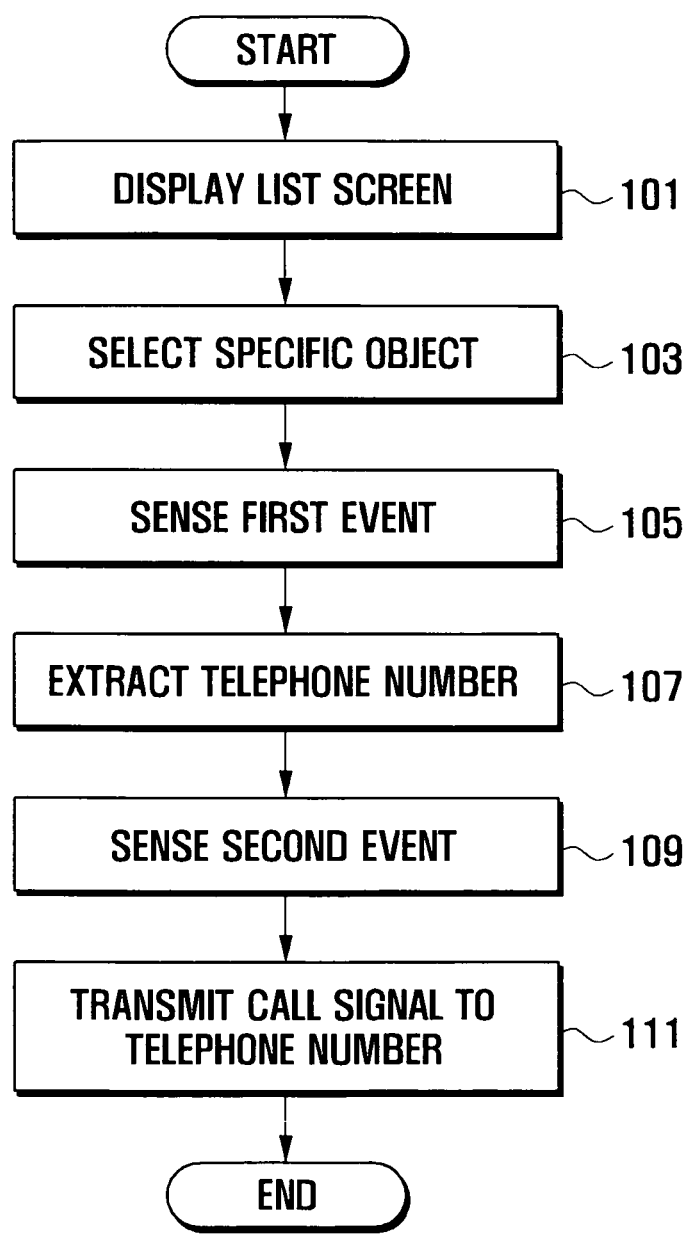
- FIG. 1 is a flow chart illustrating an automatic call connection method in a portable terminal according to an exemplary embodiment of the present invention.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal. Detailed descriptions of well-known functions and structures incorporated herein may be omitted to avoid obscuring the subject matter of the present invention.

The present invention relates to a method capable of processing a call connection in a portable terminal according to a user gesture. In particular, in an embodiment of the present invention, when a user attempts a call connection using a portable terminal, signal transmission for the call connection can be automatically processed by only a simple user gesture without a user input. Accordingly, the call connection procedure can be reduced.

Further, in an embodiment of the present invention, call connection can be automatically performed by only a gesture that a user touches the portable terminal to a face part (e.g., user's ear) without inputting a call button of the portable terminal. In this case, the present invention suggests an operation method that may reduce errors due to a user gesture at the time of the automatic call connection. For example, the present invention may perform a preparing procedure extracting a telephone number with respect to a selected object in a list by operation of a first sensor and an execution procedure transmitting a signal for the call connection to an extracted telephone number by operation of a second sensor. Namely, in an embodiment of the present invention, the first sensor and the second sensor operate to sequentially sense a first event and a second event according to a user gesture. When both of the first event and the second event are sensed, an embodiment of the present invention may perform automatic call connection based on the selected object.

Consequently, since a user may automatically connect a call by only a gesture that touches an ear with a portable terminal in a state that a specific object in the list is selected upon attempting a call connection through a specific list provided from the portable terminal, the convenience can be provided at the time of the call connection.

An operation example of the present invention summarizes as follows. First, a user selects an object including a desired user information (e.g., telephone number) for a call at the middle of a list search (e.g., highlight indication), and performs a gesture by positioning the portable terminal at a user's ear. Accordingly, when selection is achieved at a specific object in the list, the portable terminal operates a sensor (e.g., gyro sensor) that senses position information variation of the portable terminal. Further, the portable terminal senses position variation (e.g., movement from horizontal position to vertical position) thereof. At this time, the portable terminal may further perform a procedure extracting a telephone number of the focused object. When the position variation is sensed by the sensor, the portable terminal operates a sensor (e.g., proximity sensor) for sensing variation in proximity information. When an object (e.g., a user's face or ear) proximate to the portable terminal is sensed, the portable terminal performs a signal transmitting operation for automatic call connection using the extracted telephone number.

In the meantime, in an embodiment of the present invention, the list is a list including at least one specific list with telephone number information. The list may include a call log list recording and providing received and/or transmitted call particulars, a phone book list providing user information and telephone numbers mapped thereto according to a user set, and a message list recoding and providing received and/or transmitted message particulars. Hereinafter, a list is configured in multi-columns and one row as an example of a list according to the present invention. However, a list configured in one column and multi-rows, or a lattice pattern, namely, multi-columns and multi-rows can be provided.

Hereinafter, a portable terminal and a control method for automatic call connection in the portable terminal will be described. However, since the portable terminal and the control method of the present invention are not limited thereto, it should be noted that they are applicable to various embodiments based on following embodiments.

FIG. 1 is a flow chart illustrating an automatic call connection method in a portable terminal according to an exemplary embodiment of the present invention.

Referring to FIG. 1, a portable terminal firstly displays a specific list corresponding to a user request on a screen (101). The portable terminal extracts a specific list according to a user's list selection procedure and provides a list screen indication corresponding thereto. The list may include an object with telephone number information, such as a call log list, a message list, and a phone book list that has output information.

Next, the portable terminal may accept a selection of a specific object in the list on the list screen according to a user operation (103). Namely, the user may operate the portable terminal to display a screen of a desired list, and perform an operation of selecting a specific object on the list screen as a target for a call connection. Here, the operation may include selecting the specific object by generating an input signal using an input unit of the portable terminal or by generating a touch signal using a touch screen when the portable terminal includes the touch screen. Further, the selection may be indicated by a state that highlights a specific object or locates a cursor at the specific object.

Next, when a first event is sensed in a state that the specific object is selected (105), the portable terminal extracts a telephone number of the selected specific object (107). Here, the first event indicates that a first information set stored in a storage unit of the portable terminal varies. The first information may be a reference value that may measure at least one of position information variation, acceleration information variation, and tilt information variation of the portable terminal. Accordingly, the first event can be created when at least one of position information variation, acceleration information variation, and tilt information variation of the portable terminal occurs. The first event can be sensed by a first sensor of the portable terminal, and the first sensor may include a gyro sensor and an acceleration sensor. The use of the first senor to sense the first information variation is well-known. However, the present invention is not characterized in that the first sensor senses the first information variation but is characterized in that it includes the first sensor and how the portable terminal operates when the first sensor senses presence of the first information variation. In this case, the telephone number extraction of block 107 is always performed after block 105 but can be performed after block 109 to be described below. That is, the telephone number extraction of block 107 may be omitted and performed after block 109.

Next, when a second event is sensed in a state that a telephone number with respect to the specific object is extracted according to the first event (109), the portable terminal performs a signal transmitting operation for a call connection to the extracted telephone number (111). Here, the second event is an event in which second information set stored in a storage unit of the portable terminal varies. The second information can be a reference value that may measure proximity information variation and luminance information variation of the portable terminal. Accordingly, the second event can be created when at least one of proximity information variation and luminance information variation of the portable terminal occurs. The second event can be sensed by a second sensor of the portable terminal, and the second sensor may include a proximity sensor and a luminance sensor. The use of the second senor to sense the second information variation is well-known. However, the present invention is not characterized by how the second sensor senses the second information but is characterized that it includes the second sensor and how the portable terminal operates when the second sensor senses presence of the second information variation.

At this time, when the telephone number extraction is omitted after block 105, the portable terminal may sense the second event in a state in which the first event is sensed at block 109. When the second event is sensed at block 109, the portable terminal may extract a telephone number mapped to a specific object selected at block 103. Next, the portable terminal goes to block 111 to perform a signal transmitting operation for a call connection using the extracted telephone number.

Figure 2A:
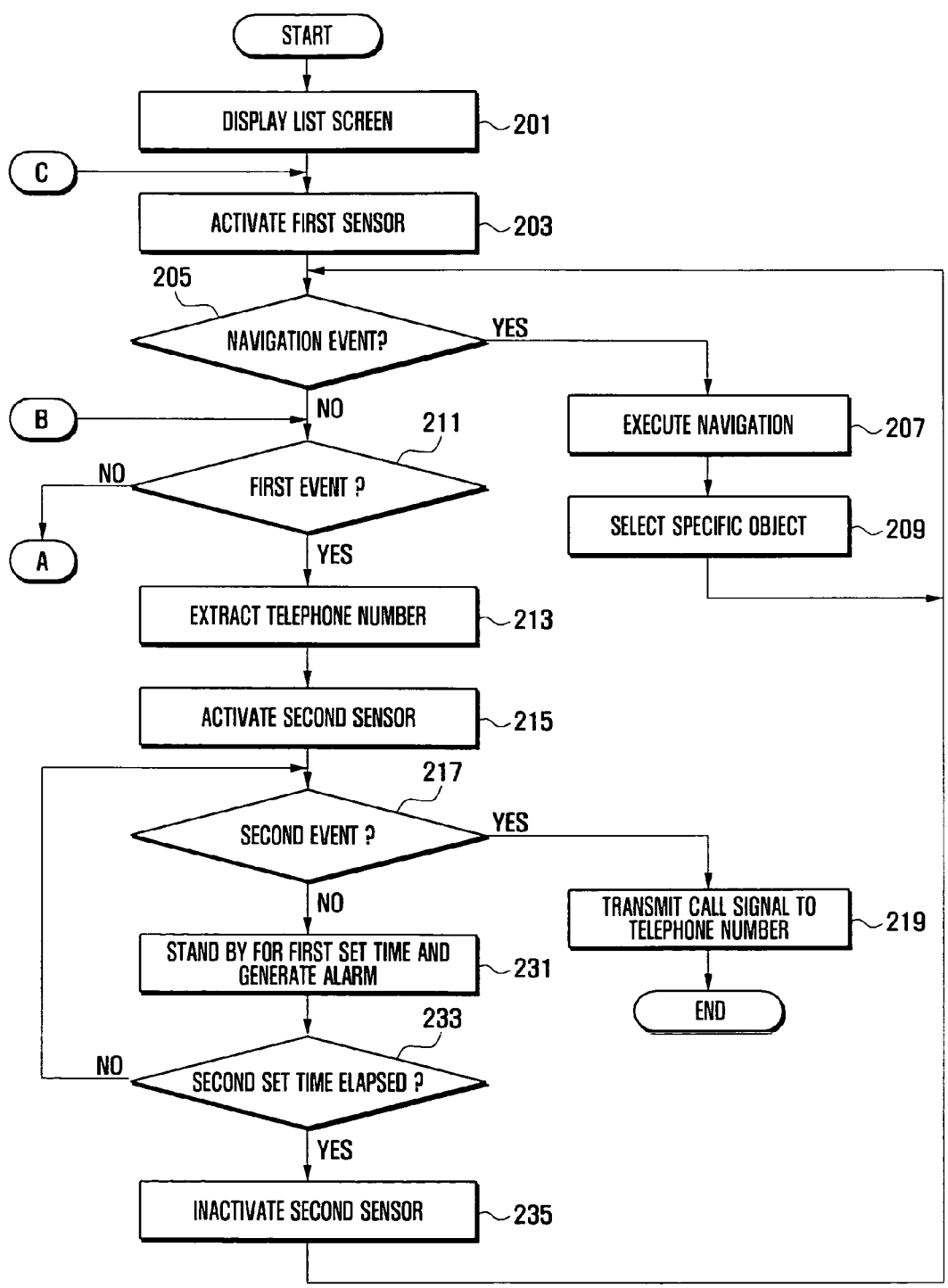
FIGS. 2A and 2B are flow charts illustrating a detailed operation of a method for providing a list according to an exemplary embodiment of the present invention.
Figure 2B:
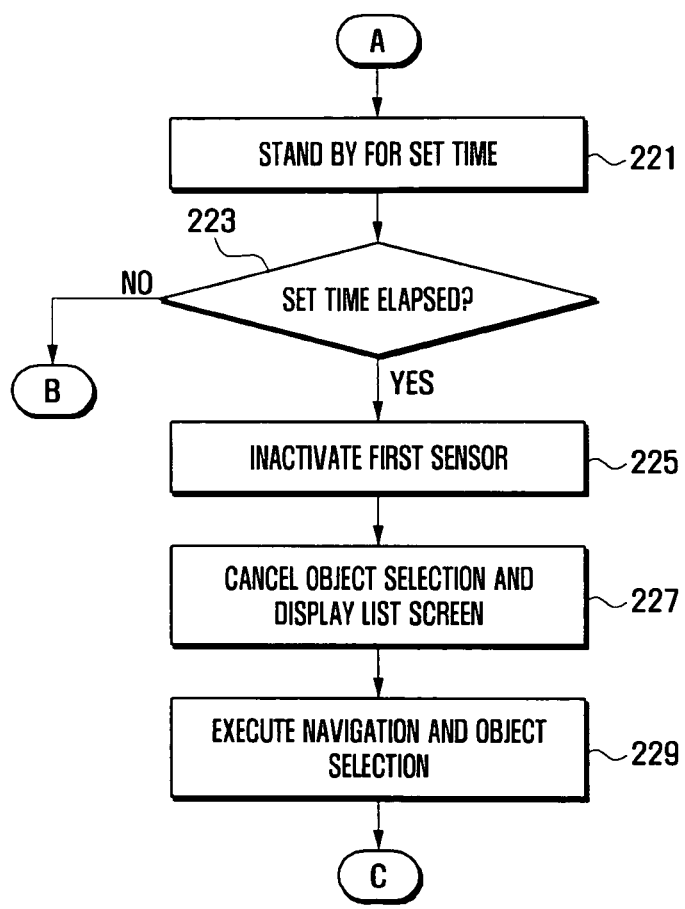

FIG. 2A and FIG. 2B are flow charts illustrating a detailed operation of a method for providing a list according to an exemplary embodiment of the present invention.

Referring to FIG. 2A and FIG. 2B, the portable terminal displays a specific list corresponding to a user request on a screen (201). The list may include at least one object with a specific telephone number corresponding to wired communication or wireless communication. The list includes a call log list, a message list, and a phone book list. Upon displaying the list screen, a leftmost object of the list may be automatically selected.

Next, the portable terminal activates a first sensor upon displaying the list (203). The first sensor may be a sensor for sensing a first event indicating that first information varies as illustrated with reference to FIG. 1. The first sensor can be a gyro sensor or an acceleration sensor. Here, the first event indicates that the first information previously defined in the portable terminal varies. The first information may be a reference value that may measure at least one of position information variation, acceleration information variation, and tilt information variation of the portable terminal.

Next, the portable terminal may activate the first sensor, and then may perform control operation according to a sensed specific event corresponding to a user request when the specific event is sensed. For example, the portable terminal may activate the first sensor and then check whether a navigation event executing navigation between objects of the list is sensed (205).

When the navigation event is sensed (Yes at block 205), the portable terminal performs navigation between objects of the list corresponding to the navigation event (207). Next, the portable terminal may select a specific object in the list according to a user operation while executing the navigation corresponding to the navigation event (209). Here, the user may perform a navigation function and select a specific object in various manners according to a form of the portable terminal. For example, the user may perform a navigation function and select a specific object by generating an input signal using an input unit of the portable terminal or by generating a touch signal using a touch screen when the portable terminal includes the touch screen. In addition, the selection of the specific object may indicate a selected state of the specific object that highlights a specific object or locates a cursor at the specific object. Next, when the navigation is executed and the specific object is selected, the portable terminal may go to block 205 to perform following procedures.

Conversely, when the navigation event is not sensed (No at block 205), the portable terminal checks whether the first event by the first sensor activated at block 203 is sensed (211).

When the first event is sensed by the first sensor (Yes at block 211), the portable terminal extracts a telephone number of the specific object selected in the list (213). Here, the selected specific object may be an object that is located at an uppermost position of the list upon displaying the list screen at block 201 to be automatically selected or an object selected by a user through blocks 205 to 209. Further, the portable terminal may perform buffering temporarily storing the extracted telephone number.

Then, when the portable terminal extracts a telephone number with respect to the specific object, it activates a second sensor (215).

The second sensor may be a sensor for sensing a second event indicating that a second information varies as illustrated with reference to FIG. 1. The second sensor can be configured by a proximity sensor or a luminance sensor. Here, the second event indicates that a second information previously defined in the portable terminal varies. The second information may be a reference value that may measure at least one of position information variation, acceleration information variation, and tilt information variation of the portable terminal.

Subsequently, the portable terminal checks whether a second event is sensed by the second activated sensor (217).

When the second event is sensed by the second sensor (Yes at block 217), the portable terminal performs a signal transmitting operation for a call connection to the extracted telephone number (219). At this time, the portable terminal may load a buffered telephone number to process a signal transmitting operation for a call connection to the loaded telephone number. Here, when the portable terminal includes a touch screen, it may further perform a function for locking the touch screen upon sensing the second event by the second sensor.

Conversely, when the second event is not sensed by the second sensor (No at block 217), the portable terminal may operate in stand by mode for a first set time and then generate an alarm (231). Here, the alarm outputs information indicating that a second event is not sensed after performing an operation according to the first event, and can be provided, for example, by flickering of a display unit, outputting of a warning sound, and/or generating a vibration. Next, the portable terminal checks whether a second set time elapses after the generation of the alarm (233). When the second set time does not elapse (No at block 233), the portable terminal goes to block 217 to check whether the second event is sensed to the elapse of the second set time. When the second event is sensed before the elapse of the second set time, the portable terminal returns to block 217. Here, the first set time represents a set value for generating the alarm, and the second set time represents a set time for waiting for the generation of the second event. Accordingly, the first set time is set at a value less than the second set time. Further, the first set can be counted more than once within the second set time. For example, assuming that the first set time is two seconds and the second set time is ten seconds, the portable terminal may check whether the second event occurs for ten seconds being the second set time, and inactivate the second sensor after ten seconds elapse. Meanwhile, the portable terminal may generate the alarm in units of two seconds being the first set time for a total of five times in ten seconds being the second set time.

When the second set time elapses (Yes at block 233), the portable terminal inactivates the second activated sensor (235). Namely, the portable terminal performs stands by sensing of the second event for the second set time, and inactivates the second sensor after the second set time elapses. Further, after inactivation of the second sensor, the portable terminal returns to block 205 to re-perform the foregoing procedures.

Meanwhile, when the first event is not sensed by the first sensor (No at block 211), the portable terminal stands by a set time (221, 223). At this time, when the set time does not elapse (No at block 223), the portable terminal proceeds to block 211 to check whether the first event is sensed until the set time elapses. When the first event is sense before the set time elapses, the portable terminal proceeds to block 213.

When the set time elapses (Yes at block 223), the portable terminal inactivates the first activated sensor (225). Namely, the portable terminal performs stands by sensing of the first event for the set time, and inactivates the first sensor after the set time elapses. After the inactivation of the first sensor, the portable terminal cancels the selection of the selected specific object and displays a list screen according thereto (227). Namely, the selection of a specific object automatically selected upon displaying the list screen at block 201 or a specific object selected at block 209 may be cancelled to cancel selection of an object. Further, the portable terminal displays a list screen in which no objects are selected.

Next, the portable terminal may cancel selection of the object, display a list according thereto, and perform a corresponding operation. For example, the portable terminal may execute navigation for object selection of a user to select a specific object (229). In this case, the portable terminal goes to block 203 to activate the first sensor inactivated at block 225 and to perform the foregoing procedures. Further, after displaying the list screen, the portable terminal may terminate the foregoing operations in response to a user's termination request.

Figure 3:
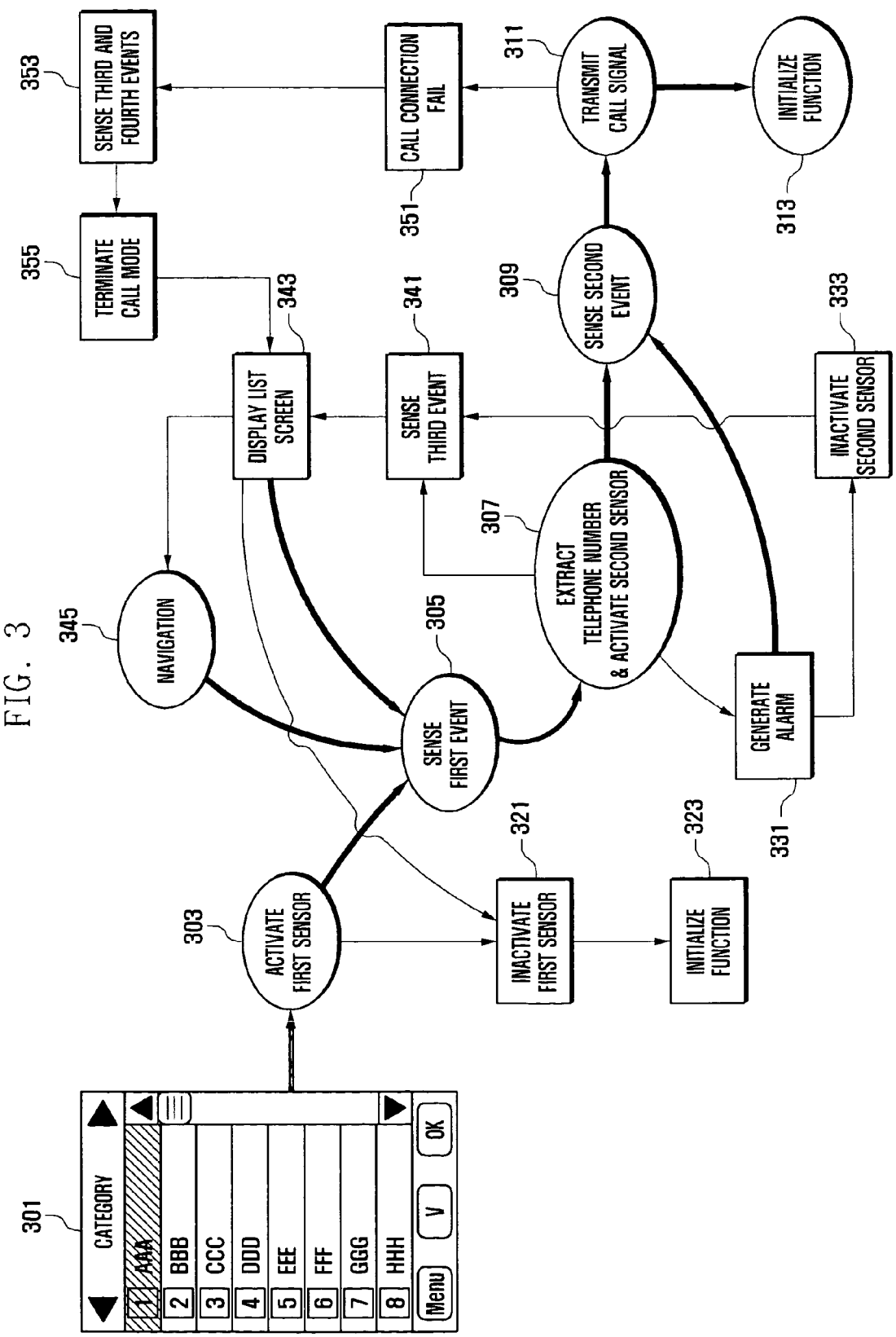
FIG. 3 is a view illustrating an operation of an automatic call in a portable terminal according to an exemplary embodiment of the present invention.

FIG. 3 is a view illustrating an operation procedure of an automatic call in a portable terminal according to an exemplary embodiment of the present invention.

Referring to FIG. 3, the portable terminal may display a specific screen according to a user request (301). At this time, as illustrated in block 301, a specific object in the list may be selected. The selection may be designated automatically by an uppermost object among objects in the list at a time the list or a specific object is provided according to a user's navigation execution. If the portable terminal supports no objects at the time the initial list is provided, the initial list screen can be provided in a state that no objects are selected.

Next, as illustrated in block 301, when a specific object is selected, the portable terminal may activate a first sensor (303). Further, when a first event according to a first information variation is sensed by the first sensor (305), the portable terminal may extract a telephone number of a selected objected. When the telephone number of the selected object is extracted, the portable terminal may activate a second sensor (307). When the telephone number of the selected object is not extracted at block 307, the portable terminal may further perform an operation of outputting an error message. Namely, when the selected object does not have a corresponding telephone, the portable terminal outputs a guide message indicating that an automatic call connect cannot be performed because the telephone number at block 307 was not extracted. Next, the portable terminal goes to block 301 according to a user selection to perform a navigation operation for selecting an object. In this case, activation of the second sensor can be omitted.

After the activation of the second sensor, when a second event according to a second information variation is sensed (309), the portable terminal performs a call connection using the extracted telephone number (311). When the call connection is achieved at block 311, the portable terminal may initialize the foregoing executed functions (313).

As described above, when a user selects an object having a telephone number from a specific list, the portable terminal of the present invention activates the first sensor. When the user performs a gesture of placing the portable terminal at a user's face, the portable terminal senses a first event by the first sensor due to a first information variation, extracts a telephone number, and activates the second sensor. Meanwhile, when a user's gesture of placing the portable terminal to the user's face occurs, the portable terminal senses a second event by the second sensor due to a second information variation, and processes a signal transmitting operation for a call connection using the extracted telephone number.

Meanwhile, when the first event is not sensed within a set time after activation of the first sensor at block 303, the portable terminal inactivates the first activated sensor (321). Further, the portable terminal initializes advanced processing for the automatic call connection, namely, an automatic call connection function (323). Upon initializing the automatic call connection function, the portable terminal omits an indication representing that the specific object was selected at block 301, and provides a list screen in which no objects are selected.

Further, after the activation of the second sensor at block 307, the portable terminal may sense a third event (341). Here, the third event indicates that a third information set stored in a storage unit of the portable terminal varies. The third information set may be a reference value that may measure at least one of position information variation, acceleration information variation, and tilt information variation of the portable terminal. Namely, the third information set may correspond to the first information set. For ease of description, the first information set and the third information set are illustrated to distinguish from each other in FIG. 3.

In other words, a user may gesture by taking the portable terminal again to distinguish from a screen in a state that the user takes the portable terminal to a face part. Accordingly, the portable terminal senses the third event achieved due to a third information variation by the first sensor according to the user gesture. Further, when the third event is sensed, the portable terminal displays a list screen as illustrated in block 301 (343).

Next, the portable terminal may select a specific object according to navigation execution between objects in the list according to a user request (345). When no events occur within a set time after displaying the list screen, the portable terminal may proceed to block 321 to inactivate the first sensor. When the specific object is again selected after displaying the list screen and a first event is sensed as illustrated in block 305, the portable terminal may proceed to block 307 to perform the foregoing procedures.

Meanwhile, when the second event is not sensed for a first set time after the activation of the second sensor at block 307, the portable terminal may generate an alarm at every interval of the first set time (331). Accordingly, when the first sensor or the second sensor is activated, the portable terminal drives a timer to start counting according to operations of the sensors. When the second event is not sensed until the elapse of the second set time according to the counting of the second sensor, the portable terminal may inactivate the second activated sensor (333). Further, after the second sensor is inactivated, the portable terminal proceeds to block 341 to process an operation according to sensing by the third sensor or terminate the automatic call connection function according to a user request.

In the meantime, when a call connection fails (351) after a call signal transmission for the automatic call connection is achieved at block 311, the portable terminal may sense a third event and a fourth event (353). Here, the fourth event is an event in which a fourth information set stored in a storage unit of the portable terminal varies. The fourth information set can be a reference value that may measure proximity information variation and luminance information variation of the portable terminal. Namely, the fourth information set may correspond to the second information set. For ease of description, the second information set and the fourth information set are illustrated to distinguish from each other in FIG. 3.

In other words, the user may gesture by taking the portable terminal to an original position for re-searching an object or call re-connection due to a failure of a call connection in a state where the user touches the portable terminal to a face part. Accordingly, the portable terminal simultaneously senses a third event and a fourth event due to the third information set variation and fourth information set variation detected by the first sensor and the second sensor according to the user gesture. When the third event and the fourth event are sensed, the portable terminal terminates the foregoing executed call mode (355). After termination of the call mode, the portable terminal may proceed to block 343 to re-perform the foregoing operation or to terminate an automatic call connection function according to the user request.

The foregoing was a control operation of a portable terminal according to an embodiment of the present invention for an automatic call connection function. The automatic call connection function of the portable terminal can be controlled by a controller 470 to be illustrated in FIG. 4 below or software with an algorithm controlling the automatic call connection function.

Hereinafter, a configuration of the portable terminal processing an automatic call connect function according to the present invention as mentioned above will be described. However, since the configuration of the portable terminal according to the present invention is not limited to the following contents, it should be noticed that the configuration of the portable terminal is applicable to various embodiments based on following embodiments.

Figure 4:
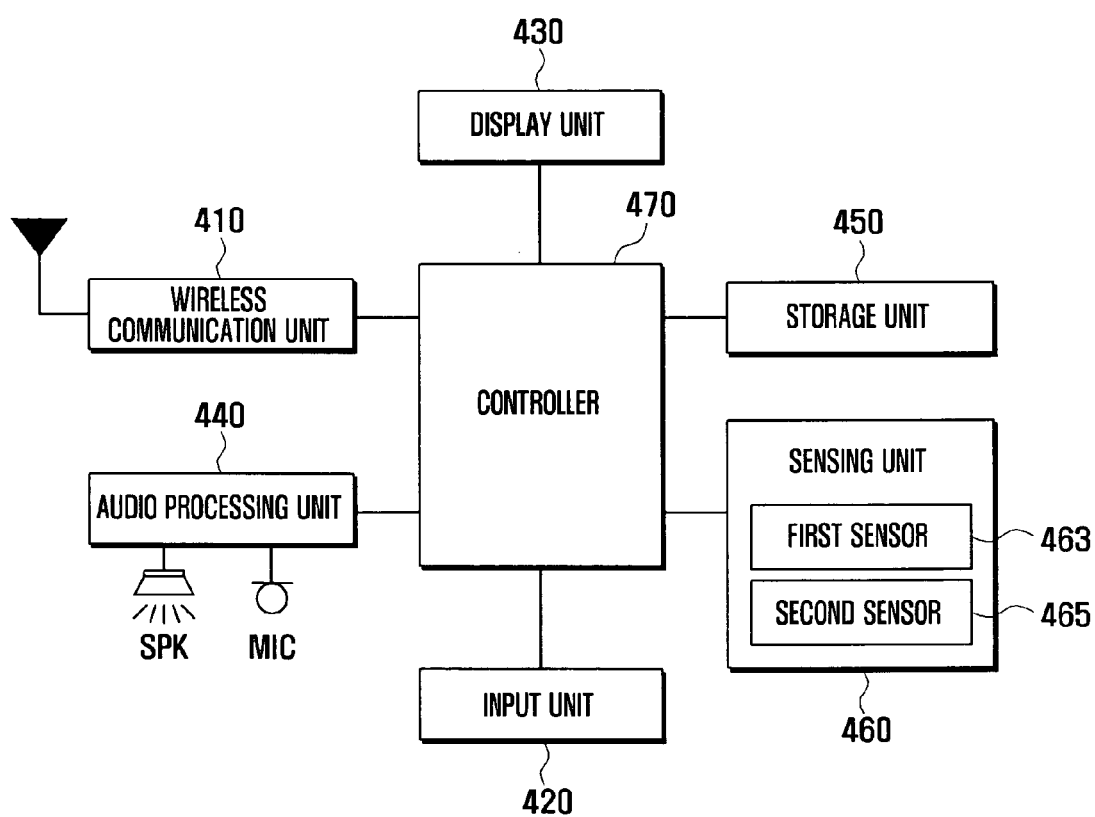
FIG. 4 is a block diagram illustrating a configuration of a portable terminal according to an exemplary embodiment of the present invention.

FIG. 4 is a block diagram illustrating a configuration of a portable terminal according to an exemplary embodiment of the present invention.

Referring to FIG. 4, the portable terminal of the present invention includes a wireless communication unit 410, an input unit 420, a display unit 430, an audio processing unit 440, a storage unit 450, a sensing unit 460, and a controller 470. The audio processing unit 440 may include a speaker SPK and a microphone MIC, and the sensing unit 460 may include a first sensor 463 and a second sensor 465. The following is a detailed explanation of respective structural elements of the portable terminal.

The wireless communication unit 410 performs communication for the portable terminal. That is, the wireless communication unit 410 forms a supporting network (base station or the like) and a set communication channel to process the transmission and reception of signals associated with wireless communication such as voice communication and image communication and data communication such as a Short Message Service (SMS), a Multimedia Messaging Service (MMS), and Internet under the control of the controller 470. The wireless communication unit 410 may include a transceiver up-converting a frequency of a transmitted signal and amplifying the signal, and low-noise-amplifying a received signal and down-converting the signal. When the portable terminal transmits a call signal for an automatic call connection as shown in FIG. 1 to FIG. 3, the wireless communication unit 410 transmits a corresponding signal through a set communication channel. Here, the communication channel may include a mobile communication channel such as Code Division Multiple Access (CDMA), Time Division Multiple Access (TDMA), and Orthogonal Frequency-Division Multiple Access (OFDMA) and an Internet communication channel of a type such as a wired Internet or a wireless Internet.

The input unit 420 transfers an input signal for inputting various numeric and character information, and an input signal associated with the setting of respective functions of the portable terminal and the control of the respective functions to the controller 470. The input unit 420 includes an input key for inputting an input signal of the portable terminal and function keys. The function keys may include arrow keys, side keys, and hot keys set to perform specific functions. The input unit 420 can be configured by one or a combination of a touch pad, a touch screen, a keypad of a general key pattern, and a QWERTY key pad according to a provided type of the portable terminal. In particular, the input unit 420 may generate an input signal for controlling navigation between objects in a list on a list screen of specific data, and provide the input signal to the controller 470. The input signal for controlling navigation can be provided in one type of a key signal according to the arrow keys or a touch signal according to touching of the touch screen.

The display unit 430 outputs a screen activated according to function execution of the portable terminal. For example, the display unit may output a boot screen, an idle screen, a menu screen, a list screen, and a play screen. That is, the display unit 430 may display all types of screens associated with a state and operation of the portable terminal. A Liquid Crystal Display (LCD) or an Organic Light Emitting Diode (OLED) is applicable as the display unit 430. Further, the display unit can be implemented in a touch screen type. In this case, the display unit 430 may simultaneously perform input and output functions.

When the display unit 430 is implemented by the touch screen to perform an input function, navigation between objects on a list screen can be controlled by a touch input. That is, a user may generate a touch input at an area in which a desired specific object is provided to control the navigation and selection. Moreover, the display unit 430 may provide a selected state such as a highlight indication or cursor indication at a corresponding object requested from a user upon displaying the list screen.

Furthermore, when an automatic call connection function is executed, the display unit 430 can be turned on/off under the control of the controller 470. For example, when the controller 470 performs an operation according to sensing of the second event by the second sensor 465, the display unit 430 can be turned-off by the controller 470. At this time, when the display unit 430 includes a touch screen, a touch signal sensing function of the touch screen can be locked by the controller 470. In addition, the display unit 430 may display various messages (e.g., error message, guide message) under the control of the controller 470 when the automatic call connection function is executed.

The audio processing unit 440 may include a speaker SPK for playing an audio signal of the portable terminal and a microphone MIC for collecting an audio signal such as a user's voice. The audio processing unit 440 connects with the microphone MIC and the speaker SPK. The audio processing unit 440 converts an audio signal received from the microphone MIC into data, and outputs the data to the controller 470. The audio processing unit 440 outputs an audio signal input from the controller 470 through the speaker SPK. Namely, the audio processing unit 440 converts an analog audio signal input from the microphone MIC into a digital audio signal and outputs it to the controller 470, or converts a digital audio signal input from the controller 470 into an analog audio signal and outputs it through the speaker SPK. In addition, the audio processing unit 440 may output various audio components (e.g., audio signal according to play of data and audio signal for effect alarm at the time of scrolling a list) according to a user's selection. In particular, the audio processing unit 440 may output an alarm generated upon execution of the automatic call connection function.

The storage unit 450 can be configured by a Read Only Memory (ROM) and a Random Access Memory (RAM). The storage unit 450 stores various data generated and used in the portable terminal. The data includes data (e.g., call log data, phone book data, music data, image data, broadcasting data, photograph data, message data, or the like) generated according to function execution of the portable terminal, all types of storage data generated using the portable terminal or received from an external device (e.g., web server, external portable terminal, or PC), and applications for direct execution of corresponding function/menu set among support functions of the portable terminal.

The storage unit 450 may store software associated with control of the automatic call connection function. Further, the storage unit 450 may store various set information according to a use of the portable terminal and the automatic call connection function. The set information may contain the set time, the first set time, and the second set time as illustrated in FIG. 1 to FIG. 3. Further, the storage unit 450 may store a list composed of at least one object with telephone number information, and reference values of the first information set, second information set, third information set, and fourth information set corresponding to the automatic call connection function.

Furthermore, the storage unit 450 may include at least one buffer temporarily storing data created during function execution of the portable terminal. For example, the storage unit 450 may buffer a telephone number with respect to a specific object extracted during operation of the automatic call connection function by a designated size. The storage unit 450 is configured at an inside of the portable terminal or at an outside thereof like a smart card. The storage unit 450 may include all internal/external storage media of the portable terminal. The storage unit 450 may include a RAM, an ROM, and a flash memory. The storage unit 450 can be configured by a RAM, an ROM, a flash memory, one integrated memory, or two integrated memories like a multi chip package (MCP) memory.

The sensing unit 460 can be activated upon an operation of the automatic call connection function as illustrated in FIG. 1 to FIG. 4, and senses an event according to information variation set upon an operation of the automatic call connection function and provides a sensed result signal to the controller 470. In particular, in an embodiment of the present invention, the sensing unit 460 can be composed of a first sensor 463 and a second sensor 465. In this case, the present invention is not limited to the sensing unit composed of two sensors. That is, the sensing unit can be composed of more than three sensors or one sensor capable of sensing both the first event and the second event.

The first sensor 463 represents a sensor that senses a first event and/or a third event in which first information set and/or third information set varies as illustrated with reference to FIG. 1 to FIG. 3. The first sensor 463 can be configured as a gyro sensor or an acceleration sensor. The first sensor 463 is provided at an inside of the portable terminal. The first sensor 463 senses tilt variation, acceleration variation, and position variation, generates a first event and/or a third event according thereto, and provides it to the controller 470.

The second sensor 465 represents a sensor that senses a second event and/or a fourth event in which second information set and/or fourth information set varies as illustrated with reference to FIG. 1 to FIG. 3. The second sensor 465 can be configured as a proximity sensor or an luminance sensor. The first sensor 465 is provided at a front side (e.g., a speaker part of a front top end for outputting a received sound) of the portable terminal or an inside of a display unit. The second sensor 465 senses presence of proximity to a user's face (e.g., proximity information variation and luminance information variation), generates a second event and/or a fourth event according thereto, and provides it to the controller 470.

The controller 407 controls the overall functions of the portable terminal and the signal flow between respective structural elements therein. The controller 470 controls the signal flow among the wireless communication unit 410, the input unit 420, the display unit 430, the audio processing unit 440, the sensing unit 460, and the storage unit 450.

The controller 470 controls a general call connection function and the automatic call connection function of the present invention as illustrated in FIG. 1 to FIG. 4. Namely, the controller 470 controls a series of operations associated with a general call connection operation and the automatic call connection operation according to a user request. In particular, the controller 470 controls the display of a list by the display unit 430 corresponding to a user request upon operating the automatic call connection function.

Furthermore, when a specific object is selected from the list by the user, the controller 470 controls activation of the first sensor 463. When a first event sensing signal indicating a first information set variation from the first sensor 463 is transferred to the controller 470, the controller 470 controls the extraction of a telephone number with respect to the selected object and activation of the second sensor 465. Next, when a second event sensing signal indicating a second information set variation from the second sensor 463 is transferred to the controller 470, the controller 470 controls a call signal transmitting operation using the extracted telephone number. Furthermore, the controller may control inactivation of the first sensor 463 and the second sensor 465 according to the third event and the fourth event as illustrated with reference to FIG. 3. That is, the controller 470 may control overall operations associated with an operation of the automatic call connection function of the present invention as illustrated in FIG. 1 to FIG. 4. A series of control functions of the controller 470 as mentioned previously can be implemented and provided by software.

In the meantime, FIG. 4 shows a schematic configuration of the portable terminal by way of example for convenience of description. However, the portable terminal of the present invention is not always limited to the foregoing configuration.

Accordingly, the controller 470 may include a baseband module for a mobile communication service of the portable terminal. The baseband module can be provided at each or one of the controller 470 and the wireless communication unit 410.

Although not shown in FIG. 4, the portable terminal of the present invention may include a near distance communication module for near distance communication, a camera module photographing still/moving images of an subject, an interface unit for transmission and reception of data in a wired or wireless communication scheme, an Internet communication module communicating with the Internet to execute an Internet function, and a digital broadcasting module executing digital broadcasting receiving and playing functions.

Since the structural elements can be variously modified according to a convergence trend of a digital device, all elements cannot be described. Structural elements equivalent to the foregoing structural elements can be included in the portable terminal. In the portable terminal of the present invention, specific elements can be excluded from the foregoing structural elements according to a providing form or substituted by other elements. This will be easily appreciated by a person having ordinary skill in the art.

Furthermore, the portable terminal according to an embodiment of the present invention may include a device of all forms providing a specific list. For example, the portable terminal may include all kinds of information and communication devices and multi-media devices such as Portable Multimedia Player (PMP), digital broadcast player, Personal Digital Assistant (PDA), music player (e.g., MP3 player), portable game terminal, wired and wireless telephone, smart phone, and applications thereof as well as all mobile communication terminals operating based on communication protocols corresponding to various communication systems.

A list navigation function of the portable terminal according to an embodiment of the present invention can be variably controlled by a microphone MIC, a motion sensor, or an acceleration sensor. Namely, the portable terminal can control focusing movement command by a voice recognition function, a motion recognition function, and a tilt recognition function. For example, in a state that a specific list screen is provided, a user can transfer a navigation command between objects in a list by voice recognition such as "upward movement" or "downward movement" or motion recognition such as "downward tilt" or "upward tilt" of the portable terminal.

As described above, in a call connection method of a portable terminal and an apparatus thereof according to the present invention, a user can perform call connection simply and rapidly by only making a gesture, such as taking the portable terminal to a face part (in particular, a user's ear). That is, upon call connection in a list stored in the portable terminal, the user can automatically perform call connection by only making a gesture, such as taking the portable terminal to a user's ear without input of a specific event, and accordingly the user using the portable terminal may conveniently perform an operation of transmitting a signal for a call connection.

When a call button is input in a conventional portable terminal regardless of a user's intention, an operation of transmitting a signal for a call connection is performed regardless of a user's intention. The present invention may solve the conventional problem as mentioned above. This can prevent an unnecessary billing occurrence and prevent a problem of making an unintended call connection. According to the related art, when a user attempts a call connection through a specific list, after selecting an object associated with a desired partner, a gesture of touching a portable terminal to an ear transmits an unintended call signal. However, the present invention solves such a problem of the related art. Furthermore, as mentioned above, a user may automatically transmit a signal for a call connection to an exact receiving part selected by a user by only a simple user gesture, and accordingly may reduce the inconvenience in a call connection according to the related art. The present invention may reduce the inconvenience of checking whether a button, such as an input error of a telephone number or a call button, was input properly.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A call connection method of a portable terminal, the method comprising:
   providing and displaying a contact list based at least partly upon a request of a user of the portable terminal;
   activating a first sensor for sensing movement of the portable terminal,
   determining whether an object is selected in the contact list within a first predefined time period after the first sensor is activated,
   in response to a determination that the object is selected in the contact list within the first predefined time period after the first sensor is activated, detecting a change in at least one of position information, acceleration information, or tilt information of the portable terminal;
   in response to detecting the change using the first sensor and the selection of the object in the contact list, extracting a telephone number associated with the object;
   activating a second sensor for sensing whether the portable terminal is moved proximate to a user's face when the portable terminal extracts the telephone number with respect to the object; and,
   in response to a determination that the portable terminal is present within the predefined proximity of the user's face within the second predefined period of time after the second sensor is activated, performing an automatic call connection to another portable terminal corresponding to the telephone number.

2. The method of claim 1, wherein:
   detecting the change in at least one of position information, acceleration information, or tilt information of the portable terminal comprises sensing a first event based on whether the portable terminal has been moved by the first sensor according to variation in a first information comprising at least one of position information, acceleration information, and tilt information; and
   acquiring the telephone number comprises sensing a second event based on whether the portable terminal is proximate to the user's face by the second sensor according to variation in a second information.

3. The method of claim 2, wherein detecting the change in at least one of position information, acceleration information, or tilt information of the portable terminal further comprises sensing the first event by the first sensor.

4. The method of claim 3, wherein performing an automatic call connection comprises processing a call connection to the extracted telephone number in response to the second event being sensed by the second sensor.

5. The method of claim 4, wherein processing the call connection comprises performing a transmission of a signal for the call connection using the extracted telephone number in response to the second event being sensed, the second event indicating that a second information set stored in the portable terminal varies.

6. The method of claim 5, wherein the second information is a reference value used to measure proximity to the user's face based on at least one of proximity information variation and luminance information variation of the portable terminal.

7. The method of claim 3, wherein the first event indicates that a first information set stored in the portable terminal varies.

8. The method of claim 7, wherein the first information set is a reference value used to measure movement of the portable terminal based on at least one of position information variation, acceleration information variation, and tilt information variation of the portable terminal.

9. The method of claim 1, wherein the list comprises at least one object with an associated telephone number, and is one of a call log list, a phone book list, and a message list.

10. A portable terminal comprising:
a display unit configured to display a screen of a contact list corresponding to a request of a user of the portable terminal, the list comprising one or more objects; and
a storage unit configured to store the contact list composed of the one or more objects with a corresponding telephone number for each object and a reference value corresponding to an automatic call connection function;
a sensing unit configured to sense movement of the portable terminal and proximity of the portable terminal to a user's face; and
a controller configured to:
activate a first sensor in the sensor unit for sensing movement of the portable terminal;
determine whether an object is selected in the contact list within a first predefined time period after the first sensor is activated;
in response to a determination that the object is selected in the contact list within the first predefined time period after the first sensor is activated, detect a change in at least one of position information, acceleration information, or tilt information of the portable terminal;
in response to detecting of the change using the first sensor and the selection of the object in the contact list, extracting a telephone number associated with the object;
activate a second sensor in the sensor unit for sensing whether the portable terminal is moved proximate to the user's face when the portable terminal extracts the telephone number with respect to the object, and,
in response to a determination that the portable terminal is present within the predefined proximity of the user's face within the second predefined period of time after the second sensor is activated, process a call connection to a telephone number of the selected object.

11. The portable terminal of claim 10, wherein:
the first sensor is configured to sense a first event indicating that a first information set comprising at least one of position information, acceleration information, and tilt information of the portable terminal varies; and
the second sensor is configured to sense a second event indicating that a second information set of the portable terminal varies.

12. The portable terminal of claim 11, wherein the first event indicates that the first information set stored in the storage unit varies, and the first information set is a reference value used to measure movement of the portable terminal based on at least one of position information variation, acceleration information variation, and tilt information variation of the portable terminal.

13. The portable terminal of claim 11, wherein the second event indicates that the second information set stored in the storage unit varies, and the second information set is a reference value used to measure proximity to the user's face based on at least one of proximity information variation and luminance information variation of the portable terminal.

14. A portable terminal comprising:
a display unit configured to display a screen of a contact list corresponding to a request of a user of the portable terminal, the contact list comprising one or more objects; and
an input unit configured to receive a selection of an object from the contact list;
a storage unit configured to store a list composed of the one or more objects with a corresponding telephone number for each object;
a sensing unit configured to sense, by a first sensor, at least one of position information variation, acceleration information variation, and tilt information variation of the portable terminal and to sense, by a second sensor, proximity of the portable terminal to a user's face; and
a controller configured to:
activate the first sensor in the sensor unit for sensing movement of the portable terminal;
determine whether an object is selected in the contact list within a first predefined time period after the first sensor is activated;
in response to a determination that the object is selected in the contact list, detect a change in at least one of position information, acceleration information, or tilt information of the portable terminal;
in response to detecting of the change using the first sensor and the selection of the object in the contact list, extracting a telephone number associated with the object;
activate the second sensor for sensing whether the portable terminal is moved proximate to the user's face when the portable terminal extracts the telephone number with respect to the object, and,
in response to a determination that the portable terminal is present within the predefined proximity of the user's face within the second predefined period of time after the second sensor is activated, process a call connection to a telephone number of the selected object.

15. The portable terminal of claim 14, wherein a first information set is stored in the storage unit, and the first information set is a reference value used to measure movement of the portable terminal based on at least one of position information variation, acceleration information variation, and tilt information variation of the portable terminal, and wherein a second information set is stored in the storage unit, and the second information set is a reference value used to measure proximity to the user's face based on at least one of proximity information variation and luminance information variation of the portable terminal.

* * * * *